No. 750,522.　　　　　　　　　　　　　　　　　　　　Patented January 26, 1904.

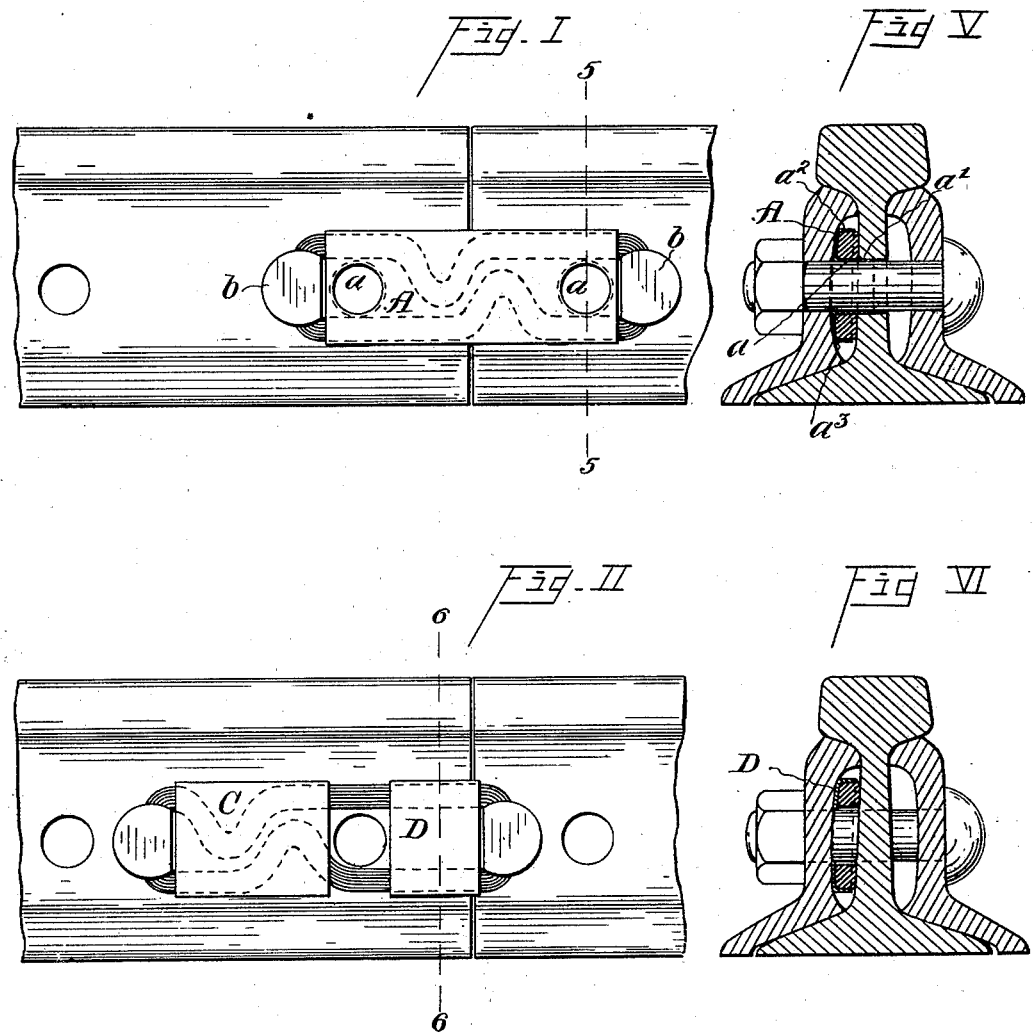

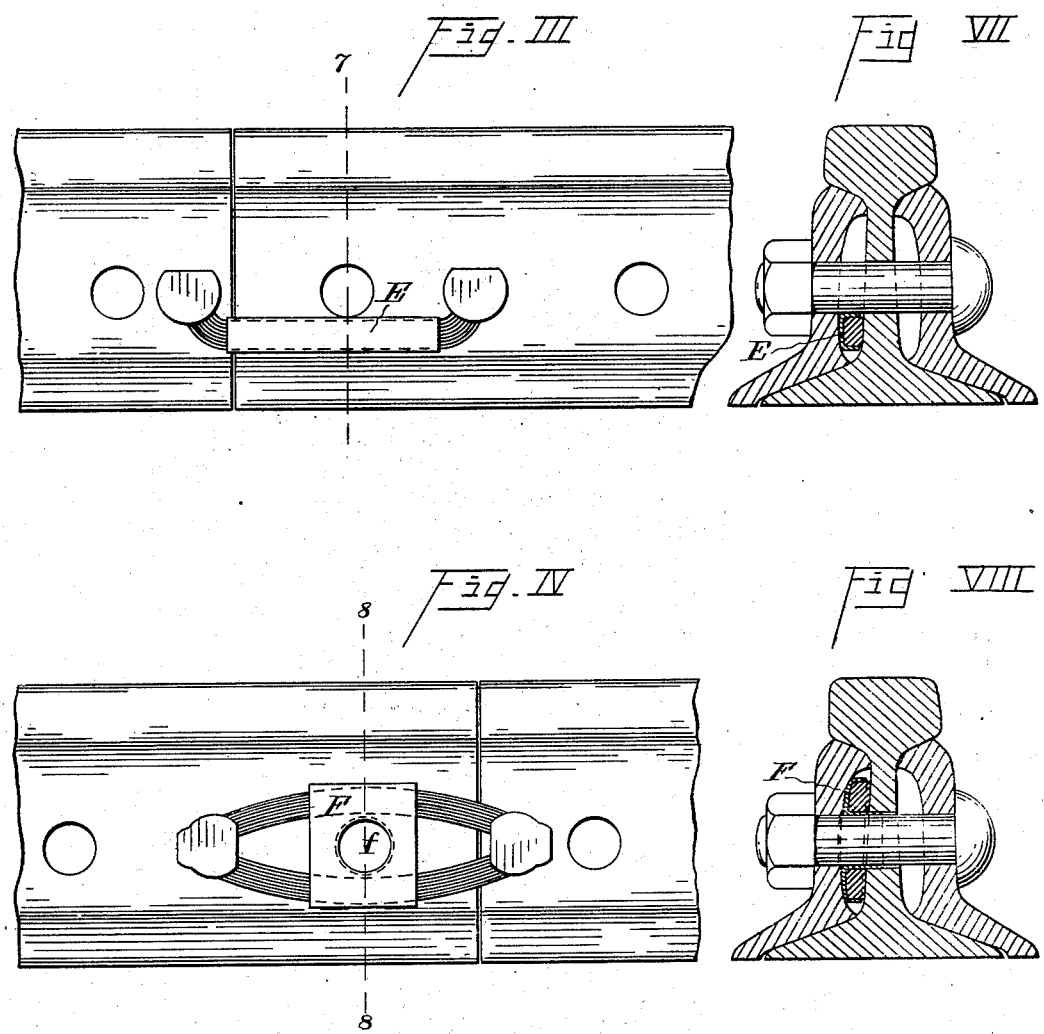

UNITED STATES PATENT OFFICE.

WILLIAM B. CLEVELAND, OF CLEVELAND, OHIO.

APPARATUS FOR BONDING RAILS.

SPECIFICATION forming part of Letters Patent No. 750,522, dated January 26, 1904.

Application filed October 30, 1902. Serial No. 129,392. (No model.)

*To all whom it may concern:*

Be it known that I, WILLIAM B. CLEVELAND, a citizen of the United States, and a resident of Cleveland, county of Cuyahoga, and State of Ohio, have invented a new and useful Improvement in Apparatus for Bonding Rails, of which the following is a specification, the principle of the invention being herein explained and the best mode in which I have contemplated applying that principle, so as to distinguish it from other inventions.

My invention relates to means for electrically joining or bonding rails for electrically-operated cars, and particularly to that class of bonding means known as the "protected rail-bond," in which the bond itself is placed between the juxtaposed rail ends and the joint-plate.

The construction upon which my invention is an improvement is arranged as follows: The web of the juxtaposed rail ends are each provided with a drilled or punched hole, and in each of these holes is secured the shank of one of the two heads of the rail-bond. Such bond consists of such two heads joined by a flexible portion made up of a plurality of flat copper wires laid one upon the other. These flexible portions are sometimes made in one piece and sometimes are divided into two branches, according to varying requirements. The joint-plate is placed over the bond and bolted to the rails, such plates being formed with a depressed inner surface for forming a chamber intermediate of it and the rails, which the bond occupies. The limitations of the dimensions of the rail and the joint-plate, which are imposed by conditions and necessities attending the construction of this class of railroads, and the necessary use of bolts for securing the plates to the rails limit the size of this chamber. In consequence of this limitation of the size of the chamber the cross-sectional area of the bond is frequently limited to an area less than that required to give the bond the required conducting capacity. When the cross-sectional area is made as nearly as possible that required to give the bond the necessary conducting capacity, the plate presses hard upon the flexible portion of the bond and the vibrations of the rails and plates caused by passing cars abrades and causes the wires of such portion to spread and move to such a degree that the copper oozes from the fissures formed by the rails and plate in thin sheets and flakes. Such action is of course very destructive of the bond's efficiency and has been long sought to be overcome. To correct this evil in the present construction, it would be necessary to reduce the cross-sectional area, so as to permit the bond to be as free as possible from contact with the joint-plate. To effect such freedom entirely would, however, reduce such cross-section below the limits of practicability. It has hence been found to be substantially impossible prior to my invention to prevent a certain amount of destruction of the wires in this method of bonding the rail. The object of my said invention is to effect such prevention; and it consists of means hereinafter fully described, and particularly set forth in the claims.

The annexed drawings and the following description set forth in detail certain means embodying the invention, such disclosed means constituting but one of various mechanical forms in which the principle of the invention may be used.

In said annexed drawings, Figures I, II, III, and IV represent in different forms side elevations of juxtaposed rail ends bonded by means embodying my invention, the joint-plates of such means being, however, removed. Figs. V, VI, VII, and VIII represent vertical transverse sections taken upon the planes indicated by lines 5 5 6 6 7 7 8 8, respectively, on Figs. I, II, III, and IV, these sections showing the joint-plates in position.

In carrying out my invention I interpose between the joint-plate and bond a sheath made of sheet metal, preferably steel, provided upon its upper and lower edges with inwardly-extending flanges which overlap the top and bottom of the flexible bond and engage the two outer longitudinal surfaces thereof and located intermediately of the heads of the bond. This shield engaging said two surfaces is held in place by the joint-plate, being pressed against the front surface of the bond by such plate, and acts as a retainer, preventing the spreading of the wires and the contact of the plate therewith. The shields in the drawings are shown exaggerated in thickness to clearly show them.

In the structure having the form of bond having two branches and having two bolts passing through such bond, as shown in Fig. I, the shield A extends almost the entire distance between the two heads $b\ b$ of the bond B and is provided with two bolt-holes $a\ a$. The edge of each such hole is provided with an inwardly-extending flange $a'$, Fig. V, which extends a distance back beyond the bond intermediately of the bolt and bond and into the web of the rail, as shown. This flange prevents the bolt from coming into contact with the wires of the flexible portion of the bond and eliminates wearing from this source and also acts as a guide for guiding the bolt into the bolt-hole of the rail-web. The flanges $a^2$ and $a^3$ of the shield engage the outer longitudinal surfaces of the two branches of the flexible portion of the bond, respectively, as shown.

In the structure shown in Fig. II, where but one bolt passes through the bond and the latter has two branches, two separate shields C and D may be employed, one on each side of the bolt, as shown.

In the form of structure shown in Fig. III when a bond of but one branch is employed one single shield E is used, and in the structure having two branch forms of bond, shown in Fig. IV with a single bolt passing therethrough, a single shield F, with a bolt-hole $f$, may be employed, as will be readily understood from the drawings. In every case, however, the shield is provided with two flanges for engaging the outer longitudinal surfaces and rests against the front surface of the bond intermediately of the joint-plate and bond.

By reason of such above-described shielded bond the chamber formed by the joint-plate and rail-webs may be filled with a bond of maximum cross-section without dislocating the wires or wearing them, as has been previously described.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. The combination of rails, a joint-plate, a flexible rail-bond intermediate of said rails and plate, a protecting-sheath intermediate of said plate and bond and intermediate of the bond-heads, engaging opposite outer longitudinal surfaces of said bond and extending transversely across its flexible portion.

2. The combination of rails, a joint-plate, a rail-bond intermediate of said rails and plate, and a protecting-sheath intermediate of said plate and bond, said sheath provided with a bolt-hole registering with the bolt-hole in the rail, the peripheral edge of such sheath bolt-hole being provided with a flange extending inwardly into its corresponding rail bolt-hole.

3. The combination of rails, a joint-plate, a rail-bond intermediate of said rails and plate, and a protecting-sheath intermediate of said plate and bond and overlapping the latter and formed with a bolt-hole registering with the bolt-hole in the rail, the peripheral edge of such sheath bolt-hole being formed with a flange extending inwardly into its corresponding rail bolt-hole intermediate of the bolt in such latter hole and the rail.

Signed by me this 18th day of October, 1902.

WILLIAM B. CLEVELAND.

Attest:
   D. T. DAVIES,
   A. E. MERKEL.